United States Patent [19]

Nomura

[11] 4,319,657
[45] Mar. 16, 1982

[54] AIR INTAKE CONDUITRY FOR A MOTORCYCLE

[75] Inventor: Kazuhiko Nomura, Iwata, Japan

[73] Assignee: Yamaha Hatsudoki Kabushiki Kaisha, Iwata, Japan

[21] Appl. No.: 78,696

[22] Filed: Sep. 25, 1979

[30] Foreign Application Priority Data

Sep. 25, 1978 [JP] Japan .................. 53-116695

[51] Int. Cl.³ ............... F02M 35/16; F02M 35/12
[52] U.S. Cl. .................................. 180/219; 181/229
[58] Field of Search ............ 181/229, 275; 123/52 M, 123/52 MV, 198 C, 198 E; 55/276, 385 B; 180/219

[56] References Cited

U.S. PATENT DOCUMENTS 2,287,806 6/1942 Kamrath ..................... 55/276
2,862,572 12/1958 Amlott ..................... 181/229 X

FOREIGN PATENT DOCUMENTS 2003870 8/1971 Fed. Rep. of Germany ........ 55/276
73049 9/1960 France .................. 123/52 MV Primary Examiner—L. T. Hix
Assistant Examiner—Thomas H. Tarcza
Attorney, Agent, or Firm—Donald D. Mon

[57] ABSTRACT

A motorcycle includes a frame that mounts an engine and a fuel tank. The fuel tank is mounted above the engine. Air intake conduitry includes an upwardly extending intake pipe, an upwardly extending connecting pipe, and a connecting box immediately beneath the fuel tank, atop the intake and connecting pipers, which serves to connect them so as to provide an air intake conduit from the atmosphere to the engine. In a V-type engine, the pipes and box are disposed in the angle between the cylinders. In multi-bank engines, which utilize a pair of intake pipes, the connecting pipe, and also an air cleaner, can be disposed between them. When the fuel tank includes a pair of draped sides to form a saddle-like tank, the connecting box can be disposed between the draped sides.

4 Claims, 2 Drawing Figures 4,319,657

AIR INTAKE CONDUITRY FOR A MOTORCYCLE

FIELD OF THE INVENTION

This invention relates to air intake conduitry for motorcycles, and especially to compact conduitry which can efficiently utilize the space above the motorcycle engine and immediately underneath the fuel tank.

BACKGROUND OF THE INVENTION

Conventionally, a motorcycle is provided with an intake pipe which extends rearwardly from the engine, and an air cleaner or like devices disposed beneath the rider's seat. This arrangement inevitably increases the length of the pipe of intake system, resulting in an increased first and last length of engine. In order to obviate this shortcoming of the prior art, it has been proposed to extend the intake pipe upwardly directly from the engine. In such a case, the air cleaner must be disposed under or between the draping sides of the fuel tank, which in turn reduces the capacity or volume of the fuel tank. Particularly in the case of a motorcycle having a V-type engine, the piping arrangement of intake and exhaust systems are inconveniently complicated. This gives rise to the demand for air intake conduitry with a simple and compact arrangement of its pipes.

BRIEF DESCRIPTION OF THE INVENTION

According to the invention, there is provided an air intake conduitry having an intake pipe extending upwardly from an engine, a connecting pipe disposed in the vicinity of the intake pipe, and a connecting box through which the upper end opening of the connecting pipe is connected to the upper end opening of the intake pipe, the connecting box being disposed immediately beneath the fuel tank. This arrangement permits reduction of the first and last length of the engine without reducing the capacity of the fuel tank, the reduction of length reducing the engine space and reduction the wheel base. The piping arrangement is effective to make motorcycle simplified and rendered compact.

According to a preferred but optional feature of the invention, an air cleaner can be connected to the lower end of the connecting pipe. In a multiple-bank engine, it can be disposed between the banks.

The above and other features of the invention will be fully understood from the following detailed description and the accompanying drawings, in which:

DETAILED DESCRIPTION OF THR INVENTION

Figure 1:
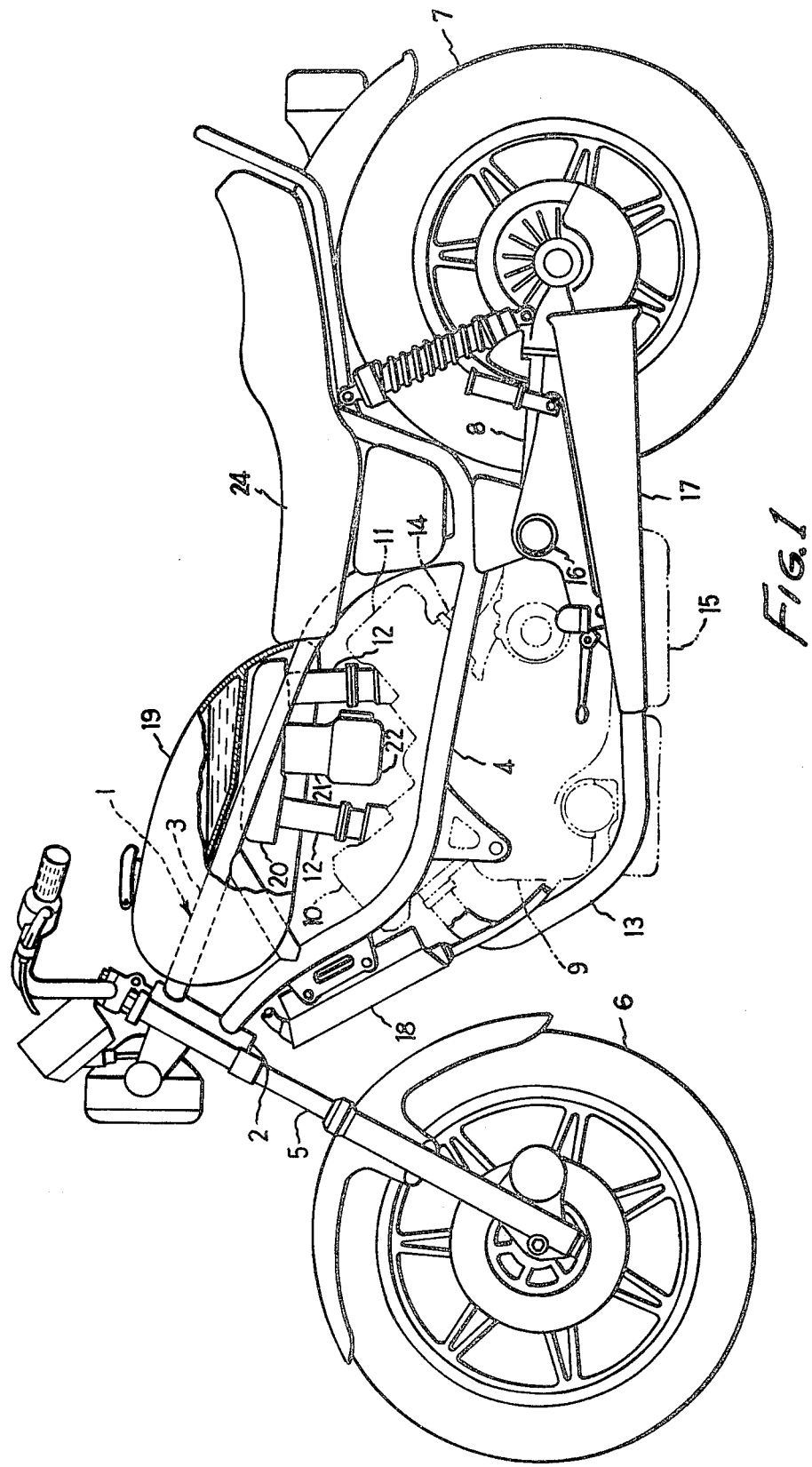
FIG. 1 is a partly-sectioned side elevational view of a motorcycle incorporating the invention.

Referring first to FIG. 1, a frame 1 and a steering head pipe 2 of a motorcycle are shown. The motorcycle is further provided with a pair (right and left sides) of tank rails 3 and also a pair (right and left sides) of side tubes 4. A front fork 5 is rotatably held to the frame by the head pipe 2. The front and rear wheels are designated by reference numerals 6 and 7, respectively. The rear wheel 7 is held by a rear arm 8 which is pivotally secured to the main frame 1 for free vertical swinging movement.

A V-type engine 9 having banks 10, 11 which are respectively inclined to the front and rear is disposed between the side tubes 4. Engine 9 is mounted with its right and left sides suspended from the side tube 4.

Multi-bank Engine 9 has intake pipes 12 disposed at the inner sides of the banks 10, 11 of cylinders. Pipes 12 extend upwardly and substantially vertically. Exhaust pipes 13, 14 are connected to the outer sides of the banks 10,11. More specifically, exhaust pipe 13 projects forwardly from the engine 9 and then bends to extend beneath engine 9 to be connected to an exhaust silencer box 15. The other exhaust pipe 14 extends rearwardly from engine 9 and through the space between the rear wheel 7 and the pivot shaft 16 of the aforementioned rear arm 8 to be connected to the silencer box 15. A silencer pipe or muffler 17 for releasing the exhaust gas rearwardly is connected to silencer box 15.

A radiator 18 is provided for cooling the cooling water circulated in the engine 9. The radiator 9 is mounted to side tubes 4.

Figure 2:
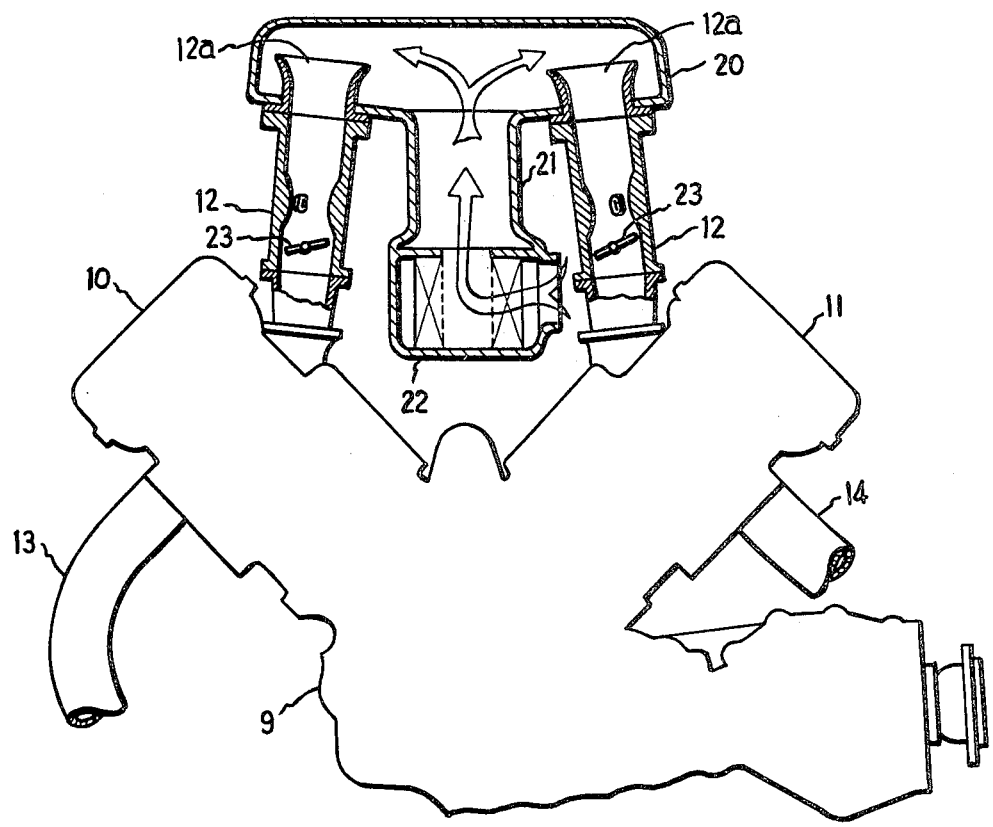
FIG. 2 is an enlarged sectional view of a portion of the motorcycle shown in FIG. 1.

A fuel tank 19 is installed to bridge both tank rails 3. It has draped sides, rather like a saddle, to form a bottom generally shaped as an inverted "U". Intake pipes 12 extend at their upper ends immediately beneath the fuel tank, between the draped sides, i.e., within the side boundaries of the tank, but of course not inside the wall of the tank where the fuel is, although fuel is contained in the draped sides on either side. As shown in FIG. 2, the intake pipes 12 have upper ends which open into the inside of a connecting box 20 disposed at a position which is between the draped sides of the fuel tank 19, and between the pair of tank rails 3. A connecting pipe 21 extends downwardly from the connecting box 20. Connecting pipe 21 is substantially parallel to the intake pipes 12 in the space between them. An air cleaner 22 is attached to the lower end of the connecting pipe 21.

Intake pipes 12 are provided with carburetors which are known per se. The carburetors have throttle valves 23 adapted to be operated to change the engine output. A rider's seat 24 is shown just behind the fuel tank.

In the embodiment having the described construction, ambient air is sucked into and through the air cleaner 22 and the connecting pipe 21, and thence through intake pipes 12 to the engine.

It will be seen that in the described embodiment, applied to a V-type engine, it is possible to arrange conduitry of the intake system in quite a simple and compact manner by efficient use of the space between the banks 10,11 of engine 9. According to this embodiment, the connecting box 20 can also play the role of an intake silencer, because it has a volume sufficiently large to absorb the pulsation of the intake flow for each cylinder. The level of the intake noise is lowered considerably.

Although the invention has thus far been described with specific reference to a V-type engine, this is not the exclusive application. The invention can also be applied to any other type of engine which is constructed to permit the vertical arrangement of an intake pipe or pipes from the engine up to the underside of the fuel tank, often between its draped sides.

As has been described, according to the invention, there is provided an intake system for motorcycles comprising an intake pipe or pipes extending upwardly from the engine, a connecting pipe disposed substantially vertically in the vicinity of the intake pipe or pipes, an air cleaner attached to the lower end of the connecting pipe and a connecting box through which the upper end opening of the connecting pipe is connected to the upper opening or openings of the intake pipe or pipes, the connecting box being disposed at the under side of the fuel tank. According to this arrangement, there is no substantial decrease of the capacity of fuel tank, because it is not necessary to install an air cleaner adjacent to the fuel tank. In addition, the reduced length of the pipes of the intake system offers the advantages of increased engine output due to reduced intake resistance, and a simplified and compact arrangement of pipes of the intake system.

This invention is not to be limited by the embodiment shown in the drawings and described in the description, but only in accordance with the scope of the appended claims.

I claim:
1. In combination:
a motorcycle frame;
a multi-bank, multi-cylinder V-type engine supported by said frame;
a fuel tank supported by said frame, said fuel tank being disposed above said engine and being generally V-shaped, with legs depending downwardly at each side; and
air intake conduitry comprising a respective air intake pipe extending upwardly from each bank of said engine, a connecting pipe extending substantially vertically adjacent to and between said intake pipes, and a connecting box disposed immediately beneath said fuel tank between said legs thereof, the upper ends of said air intake pipes also being disposed between said legs of said fuel tank, said connecting box interconnecting said upper ends of said intake pipes and said connecting pipe.

2. A combination according to claim 1 in which an air cleaner is disposed between said intake pipes and connected to the lower end of said connecting pipe.

3. A combination according to claim 2 in which the interior of said connecting box is so proportioned as to constitute an intake silencer.

4. A combination according to claim 1 in which there is a said intake pipe for each said cylinder.

* * * * *